United States Patent
Ugawa et al.

(10) Patent No.: US 9,955,066 B2
(45) Date of Patent: Apr. 24, 2018

(54) IMAGING APPARATUS AND CONTROL METHOD OF IMAGING APPARATUS

(71) Applicant: Olympus Corporation, Hachioji-shi, Tokyo (JP)

(72) Inventors: Akira Ugawa, Tokyo (JP); Tatsuyuki Uemura, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/165,746

(22) Filed: May 26, 2016

(65) Prior Publication Data
US 2016/0353013 A1 Dec. 1, 2016

(30) Foreign Application Priority Data
May 29, 2015 (JP) .................................. 2015-109989

(51) Int. Cl.
*H04N 5/232* (2006.01)
*H04N 5/225* (2006.01)

(52) U.S. Cl.
CPC ..... *H04N 5/23216* (2013.01); *H04N 5/23293* (2013.01); *H04N 5/2254* (2013.01)

(58) Field of Classification Search
CPC ........... H04N 5/23216; H04N 5/23293; H04N 5/2254
See application file for complete search history.

(56) References Cited

U.S. PATENT DOCUMENTS

| | | | | |
|---|---|---|---|---|
| 5,920,348 A | * | 7/1999 | Ejima | H04N 5/23293 348/333.09 |
| 6,647,207 B2 | * | 11/2003 | Bittner | G03B 13/14 396/377 |
| 2003/0058359 A1 | * | 3/2003 | Horii | H04N 3/1562 348/305 |
| 2007/0014551 A1 | * | 1/2007 | Fujisawa | G03B 37/02 396/20 |
| 2011/0007175 A1 | * | 1/2011 | Fujita | H04N 5/23248 348/222.1 |
| 2011/0221915 A1 | * | 9/2011 | Takano | H04N 5/23287 348/208.7 |
| 2011/0267503 A1 | * | 11/2011 | Kunishige | H04N 5/232 348/240.1 |
| 2012/0224086 A1 | * | 9/2012 | Takita | H04N 5/3454 348/243 |

(Continued)

FOREIGN PATENT DOCUMENTS

JP 2009-276464 11/2009
WO WO 2010134555 A1 * 11/2010 ........... H04N 5/2253

*Primary Examiner* — Jason A Flohre
(74) *Attorney, Agent, or Firm* — John C. Pokotylo; Pokotylo Patent Services

(57) ABSTRACT

According to the present invention, an imaging apparatus includes: an imaging unit which acquires image data by an imaging lens forming an image of an object on an imaging surface on which imaging pixels are arrayed; a designated position acquiring unit which acquires a designated position on the image data; a sighting device which allows a user to visually recognize an optical axial direction of the imaging lens; and a controller which, on the image data, adjusts a position of an object on an imaging optical axis of the imaging lens, based on the designated position.

3 Claims, 10 Drawing Sheets

(56) References Cited

U.S. PATENT DOCUMENTS

2013/0265467 A1* 10/2013 Matsuzawa ........ H04N 5/23296
    348/240.1
2014/0125867 A1* 5/2014 Curcio ................ H04N 5/2628
    348/581
2015/0138383 A1* 5/2015 Kelley ............... H04N 5/23216
    348/208.6

* cited by examiner

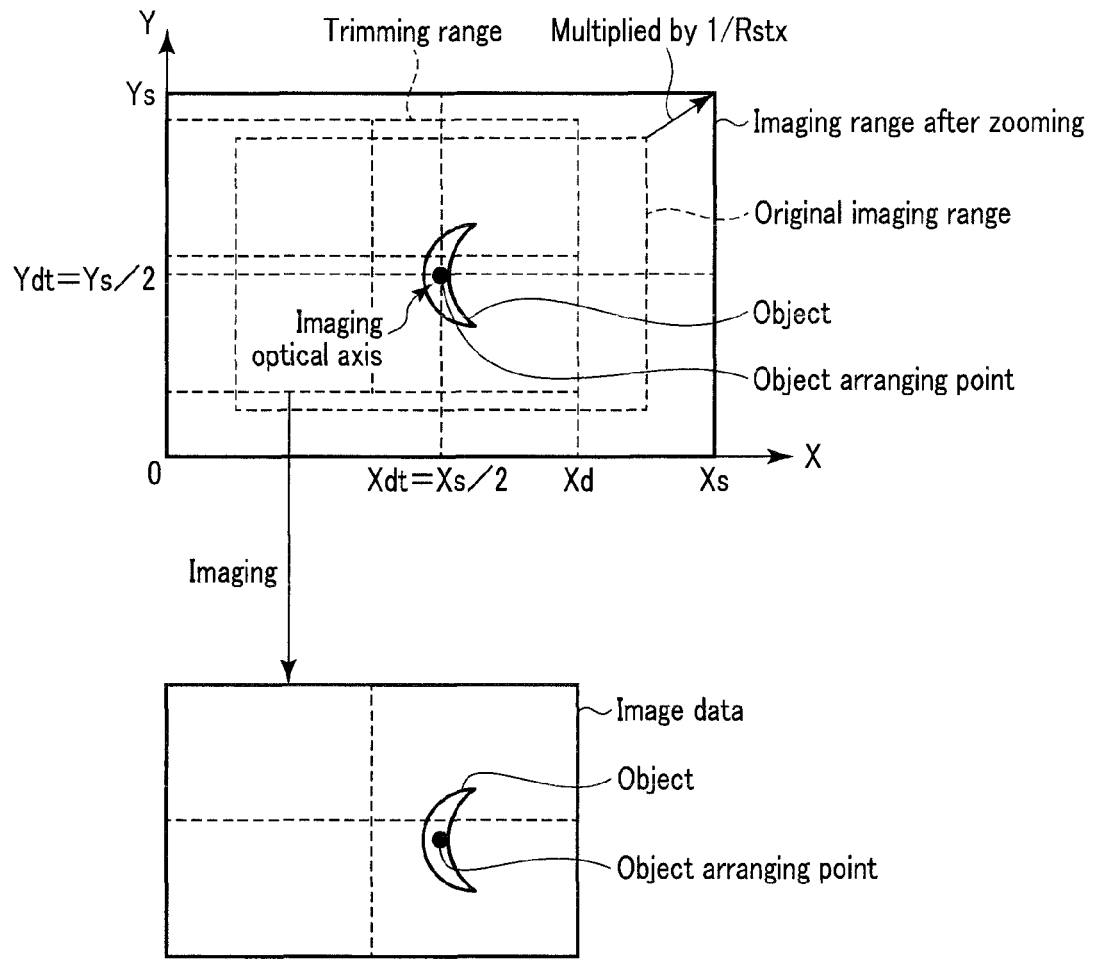
F I G. 10

US 9,955,066 B2

IMAGING APPARATUS AND CONTROL METHOD OF IMAGING APPARATUS

CROSS-REFERENCE TO RELATED APPLICATIONS

This application is based upon and claims the benefit of priority from the prior Japanese Patent Application No. 2015-109989, filed May 29, 2015, the entire contents of which are incorporated herein by reference.

BACKGROUND OF THE INVENTION

1. Field of the Invention

The present invention relates to an imaging apparatus and a control method of the imaging apparatus.

2. Description of the Related Art

Generally, an imaging apparatus comprises an imaging device for acquiring an image based on light, an optical system such as a lens for forming an image of light on the imaging device, a shutter for controlling the time at which the light passing through the optical system enters the imaging device, and a display device for displaying the image captured by the imaging device. The imaging apparatus allows a user to visually recognize an object by performing a through image display which successively displays an image imaged by the imaging device on the display device. Furthermore, a sighting device which is attachable to the imaging apparatus and allows the user to visually recognize an imaging range is put into practical use. Such sighting device is disclosed in, for example, Jpn. Pat. Appln. KOKAI Publication No. 2009-276464.

BRIEF SUMMARY OF THE INVENTION

An imaging apparatus comprising the above-mentioned sighting device is capable of aligning an imaging optical axis of the optical system with an object by superimposing a reticle (index) arranged within a visual field of the sighting device and the object. In other words, by an index indicating only a specific direction, the sighting device is configured to align a direction observed by a photographer using the imaging apparatus and the specific direction indicated by the index. By aligning the specific direction with the optical axis of the imaging apparatus, the sighting device allows a photographer to aim on the same optical axis as an imaging range of the imaging apparatus regardless of the change in field angle caused by a zoom operation. Here, the alignment with the imaging optical axis is premised on an optical zoom; however, in the case of applying this to a trimming range, etc., the alignment does not necessarily have to be made with the optical axis. In any case, there has been a problem that if an object is aimed with an index, photographing would only be performed in a similar composition. In particular, in the case of capturing an object by a sighting device which performs alignment with an optical axis, as long as the imaging range is centered on the optical axis, an object will be arranged in the center of the imaging range, which would cause a problem that the composition will become monotonous when photographing.

The object of the present invention is to provide an imaging apparatus and a controlling method of the imaging apparatus with higher convenience.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 10 is a diagram for explaining an example of trimming by the imaging apparatus according to an embodiment.

DETAILED DESCRIPTION OF THE INVENTION

Hereinafter, an imaging apparatus and a control system of the imaging apparatus according to an embodiment will be described in detail with reference to the drawings.

Figure 1:
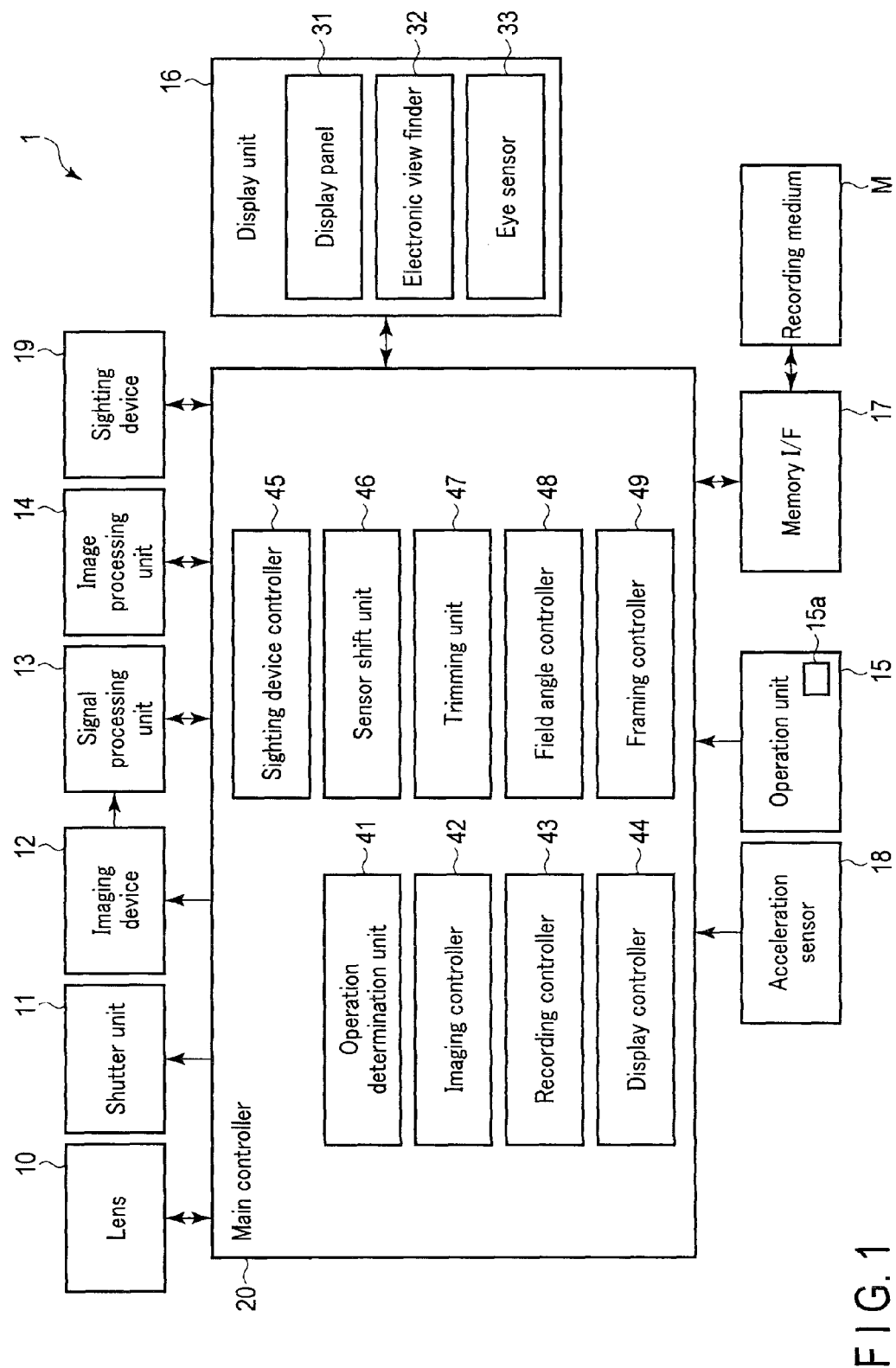
FIG. 1 is a diagram for explaining an example of a control system of an imaging apparatus according to an embodiment.

Even if an object is captured by a sighting device, the imaging apparatus 1 is capable of arranging the object to a position touched on a touch panel, which does not have to be a center of an image, and photographs a picture. As shown in FIG. 1, the imaging apparatus 1 comprises a lens 10, a shutter unit 11, an imaging device 12, a signal processing unit 13, an image processing unit 14, an operation unit 15, a display unit 16, a memory I/F 17, an acceleration sensor 18, a sighting device 19, and a main controller 20.

The lens 10 forms an image of a transmitted light on the imaging device 12. The lens 10 comprises an imaging lens which is formed by a combination of a plurality of lenses, a diaphragm mechanism, a lens controller which controls the operation of the imaging lens and the diaphragm mechanism, a focus ring, and a zoom ring.

The imaging lens forms an image of a light beam from the object on an imaging surface of the imaging device 12. The imaging lens comprises a variety of lenses, such as a lens for focusing (a focusing lens), a lens for changing a focal distance (a variator lens and a compensator lens), and a relay lens.

By moving the focusing lens in an optical axial direction of the imaging lens based on the control of the lens controller or the operation of the focus ring, the imaging lens forms the image of an object image on the imaging surface of the imaging device 12. Furthermore, by moving the variator lens and the compensator lens in the optical axial direction of the imaging lens based on the control of the lens controller or the operation of the zoom ring, the imaging lens changes the focal distance. In this manner, the lens 10 is capable of changing a field angle, that is, an imaging range.

The diaphragm mechanism is configured to open and close freely, and adjusts the amount of light beams entering the imaging device 12 through the imaging lens based on the control of the lens controller.

The lens controller is configured communicable with the main controller 20. The lens controller controls driving the focusing lens, the variator lens and compensator lens, and the diaphragm mechanism, respectively, in accordance with an input from the main controller 20, the operation of the focus ring, and the operation of the zoom ring. By detecting the position of the variator lens and the compensator lens, the lens controller is capable of detecting the focal distance of the imaging lens. The lens controller inputs the detected focal distance of the imaging lens to the main controller 20.

The shutter unit 11 is a mechanism for adjusting light quantity of light passing through the lens 10 and entering the imaging device 12. The shutter unit 11 is, for example, a focal-plane shutter.

The imaging device 12 is provided behind the lens 10, in other words, on the internal side of a housing of the imaging apparatus 1. The imaging device 12 comprises an imaging surface which is configured by arraying a plurality of imaging pixels which photoelectrically converts light and stores an electric charge. A color filter is provided on a surface of each imaging pixel in which the light enters. The imaging device 12 is, for example, configured by a charge coupled device (CCD) image sensor, a complementary metal oxide semiconductor (CMOS) image sensor, or other imaging devices. The imaging device 12 generates an image signal by converting the object image formed on the imaging surface by condensing light through the lens 10 into an electric signal (luminance signal) in accordance with the light quantity.

In the case where the focal distance of the imaging lens of the lens 10 is changed, an image is enlarged or reduced centering on an optical axis of the imaging lens. Therefore, the imaging device 12 is, for example, arranged at a position where the imaging optical axis of the imaging lens of the lens 10 and the center of the imaging surface overlap.

Furthermore, the imaging device 12 has a plurality of AF areas configured on the imaging surface. A plurality of imaging pixels, a plurality of first focusing pixels, and a plurality of second focusing pixels are arrayed on the AF area. Between the first focusing pixels and the second focusing pixels, a light incident region is limited at different positions. Likewise the imaging pixels, the first focusing pixels, and the second focusing pixels photoelectrically convert incident lights and store an electric charge. The imaging surface of the imaging device 12 is, for example, configured by arraying a plurality of imaging pixels two-dimensionally. Here, the term "two-dimensionally" is not necessarily based on a concept of excluding imaging devices having sensitivity in a depth direction or imaging devices of a random pixel arrangement, however, includes imaging devices having pixels aligned at least on a plane surface. In recent years, as countermeasures for aberration, a curved sensor with a curved imaging surface has been announced. However, since this also includes a two-dimensional array portion, broadly, this may be regarded as two-dimensional.

The imaging device 12 comprises a shift unit which shifts an effective imaging region which is a range in which a luminance signal is generated in the imaging surface. The shift unit is, for example, a sensor shift mechanism which physically shifts or rotates the imaging surface. By being driven, the sensor shift mechanism shifts the imaging surface of the imaging device 12 in a direction parallel to the imaging surface. The sensor shift mechanism also rotates the imaging surface of the imaging device 12 in a direction such as the pitch, yaw, and roll of the lens 10 and the housing of the imaging apparatus 1. The imaging surface is usually configured larger than the effective imaging region. In this case, even if the shift unit is configured to shift the effective imaging region by moving the effective imaging region within the imaging surface, an effect that is equivalent to the above sensor shift mechanism can be obtained. The imaging device 12 may also be configured to reduce the effective imaging region based on the control of the main controller 20. For example, by setting the effective imaging region smaller than the imaging surface while the center of the imaging surface and the effective imaging region remain overlapped, the imaging device 12 is able to perform electronic zoom for narrowing a field angle without changing the focal distance of the imaging lens. Furthermore, by setting an effective imaging region that is smaller than the imaging surface at any position on the imaging surface based on the control of the main controller 20, the imaging device 12 is able to perform trimming for cutting out any image within an image circle formed by the imaging lens at an effective imaging region.

The signal processing unit 13 reads out an image signal generated by the imaging device 12 based on the control of the main controller 20. The signal processing unit 13 applies various forms of signal processing to the read-out image signal based on the control of the main controller 20. The signal processing unit 13 converts the image signal to which the signal processing was applied into image data of a digital signal and inputs the data to the main controller 20.

In the above manner, the imaging unit is configured by the lens 10, the image element 12, and the signal processing unit 13.

The imaging unit acquires image data by the imaging device 12 imaging the light formed on the imaging surface by the lens 10. The imaging unit acquires the image data as a still image by the above imaging operation. The imaging unit also continuously acquires the image data for display as a through image when the imaging operation is not performed. For example, by reading out the image signal imaged by the imaging device 12 at a cycle based on the control of the main controller 20 by the signal processing unit 13, the imaging unit acquires continuous image data which can be displayed as a through image.

The image processing unit 14 performs various types of image processing on the image data, such as color correction, gamma (γ) correction, contrast correction, black/white color mode processing, and through image processing, based on the control of the main controller 20. The image processing unit 14 also compresses the image data by a Jpeg system and converts it into Jpeg data which is the image data in a Jpeg system based on the control of the main controller 20. The image processing unit 14 inputs the Jpeg data to the main controller 20.

The operation unit 15 comprises a plurality of operation members for a user to perform various types of operation of the imaging apparatus 1. The operation member includes, for example, a touch sensor 15a, a release button, a cross button, and other various types of buttons, etc. The touch sensor 15a is, for example, a resistance film type touch sensor, or a capacitance type touch sensor. In other words, the touch sensor 15a is a designated position acquiring unit which acquires information indicating a position designated within a certain region. The touch sensor 15a is provided integrally with a display panel 31 of the display unit 16 mentioned later on, detects a signal (touch position signal) indicating a position (touch position) touched on the display panel 31, and inputs the detected touch position signal to the main controller 20.

The release button is an operation member for a user to instruct the imaging apparatus 1 to perform an imaging operation and an imaging auxiliary control in order to image a still image. In the case where the release button is half-pressed, the operation unit 15 instructs the main controller 20 to perform an imaging auxiliary control such as automatic exposure (AE) processing and automatic focusing (AF) processing. In the case where the release button is fully pressed, the operation unit 15 instructs the main controller 20 to perform an imaging operation for imaging a still image.

The cross button is an operation member for a user to instruct up-down and left-right selective operations to the imaging apparatus 1. For example, in accordance with the operation of the cross button by the user, the operation unit 15 instructs the main controller 20 to perform up-down and left-right selection operation within a menu.

The display unit 16 displays a screen based on the image data input from the main controller 20. The display unit 16 comprises a display device and a drive circuit which causes a screen to be displayed on the display device based on the image data. The display unit 16 comprises, for example, a display panel 31 and an electronic view finder (EVF) 32 as the display device.

The display panel 31 is a display device for displaying, for example, a liquid crystal display, an organic EL display, or other screens. The display panel 31 functions as a touch panel (touch screen) in which the above-mentioned touch sensor 15a is integrally combined.

For example, the EVF 32 comprises a display device such as a liquid crystal display or an organic EL display, and an ocular optical system.

The display unit 16 also comprises an eye sensor 33 for detecting whether or not a user is viewing through the EVF 32. In the case where the eye sensor 33 detects that the user is viewing through the EVF 32, the display unit 16 turns off the display of the display panel 31 and performs display by the EVF 32. In the case where the eye sensor 33 does not detect that the user is viewing through the EVF 32, the display unit 16 turns off the display of the EVF 32 and performs display by the display panel 31.

The memory I/F 17 comprises a card slot into which a recording medium M comprising a plurality of contact terminals can be inserted, and a contact terminal which is electrically connected to the contact terminals of the recording medium M in the case where the recording medium M is inserted into the card slot. The recording medium M is, for example, a memory card. The memory I/F 17 relays the input and output of data between the recording medium M and the main controller 20.

The acceleration sensor 18 detects the tilt of the housing of the imaging apparatus 1 by detecting the change in the acceleration of the housing of the imaging apparatus 1. By detecting the change in the acceleration of the housing of the imaging apparatus 1, the acceleration sensor 18 detects the blur of the lens 10 and the housing of the imaging apparatus 1 in a variety of directions of such as the pitch, yaw, roll, and shift.

The sighting device 19 is a component for allowing a user to visually recognize the optical axis of the imaging lens of the lens 10.

Figure 2:
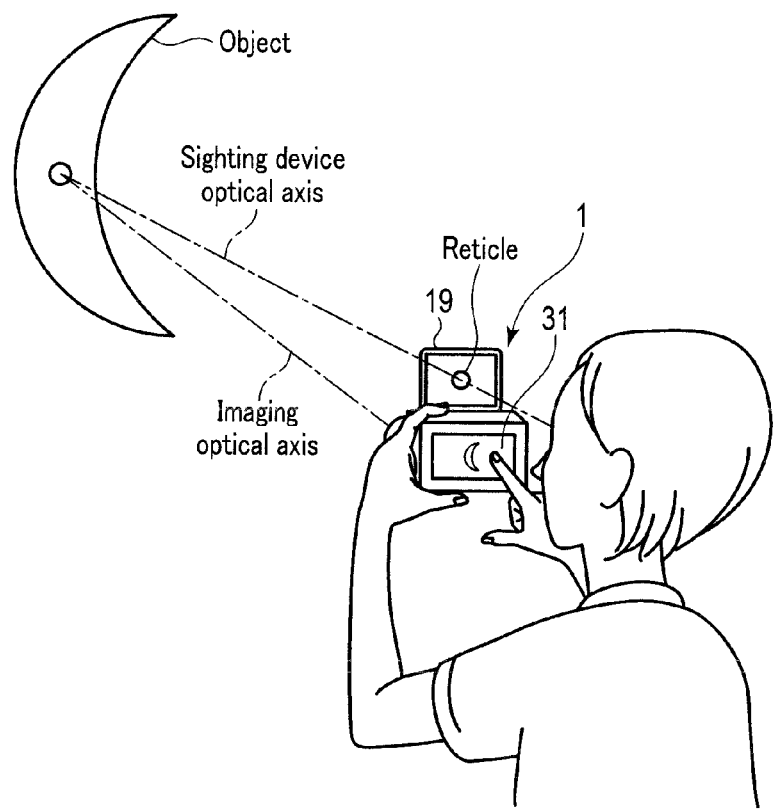
FIG. 2 is a diagram for explaining a usage example of the imaging apparatus according to an embodiment.

The sighting device 19 comprises, for example, a translucent window part and a light source part for projecting a reticle on the window part. The light source part projects the reticle at a predetermined position of the window part (for example, at the center) in a state where the reticle is visually recognizable on the optical axis (sighting device optical axis) forming a predetermined angle with respect to the surface of the window part. The sighting device 19 is provided on the imaging apparatus 1 in a manner so that the sighting device optical axis intersects with the imaging optical axis of the imaging lens at a preset distance. For example, the sighting device 19 is provided on the imaging apparatus 1 in a manner so that the sighting device optical axis intersects with the imaging optical axis of the imaging lens at infinity. At infinity, since the positional difference between the sighting device and the imaging lens can almost be ignored, the imaging optical axis and the sighting device optical axis become approximately the same direction. According to such configuration, as shown in FIG. 2, by aligning the sighting device optical axis with an object existing in infinity, the imaging optical axis can be aligned with the object. In this manner, for example, even if the focal distance of the imaging lens is in a state where the field angle, such as a telephoto area, is extremely narrow, the sighting device 19 allows the user to easily visually recognize the optical axis of the imaging lens.

The main controller 20 controls the operation of each unit of the imaging apparatus 1. The main controller 20 comprises, for example, a CPU and a memory. The main controller 20 realizes a variety of functions by, for example, having the CPU read out and execute a program stored in the memory. For example, the main controller 20 functions as an operation determination unit 41, an imaging controller 42, a recording controller 43, a display controller 44, a sighting device controller 45, a sensor shift unit 46, a trimming unit 47, a field angle controller 48, and a framing controller 49.

The operation determination unit 41 determines an operation input by the operation unit 15. In other words, the operation determination unit 41 recognizes what kind of operation has been instructed by the operation unit 15. The operation determination unit 41 also recognizes which position of the display panel 31 has been touched based on the touch position signal input from the touch sensor 15a of the operation unit 15.

In the case where an operation instructing an imaging operation is input, the imaging controller 42 controls each unit and executes the imaging operation. For example, in the case where an operation instructing the imaging operation is input, the imaging controller 42 inputs a control signal to the lens 10 and drives the diaphragm mechanism, drives the shutter unit 11, and executes the imaging operation for imaging a still image.

Prior to executing the imaging operation, the imaging controller 42 executes the imaging auxiliary control. The imaging auxiliary control is, for example, the processing such as the AF processing and the AE processing. The imaging controller 42 performs imaging auxiliary control based on the image data imaged by the imaging device 12. The imaging controller 42 performs the imaging operation by using the result of the imaging auxiliary control.

The imaging controller 42 also controls acquisition of the image data that is displayable as a through image by the imaging unit. For example, the imaging controller 42 controls the signal processing unit 13 so that the image signal generated by the imaging device 12 is read out at a preset cycle.

The imaging controller 42 also comprises, for example, an AF controller, an exposure controller, a white balance (WB) controller, and a variety of other processing units.

The AF controller controls the AF processing. For example, the AF controller generates a control signal for driving a focusing lens of the lens 10 based on the image data output from the imaging device 12, and inputs the generated control signal to the lens controller. Specifically, the AF controller generates a control signal for driving the focusing lens of the lens 10 by performing a contrast AF processing, a phase difference AF processing, or other AF processing based on the image data obtained at an optional AF area on the imaging surface of the imaging device 12.

The exposure controller controls exposure conditions. For example, the exposure controller controls exposure conditions such as an aperture size of the diaphragm mechanism of the lens 10 when photographing (aperture), releasing time of the shutter unit 11 (shutter speed), and sensitivity of the imaging device 12 (ISO sensitivity). For example, the exposure controller sets the aperture, the shutter speed, and the ISO sensitivity, etc. based on the operation of the operation unit 15.

The exposure controller also performs arithmetic processing for exposure control based on the image data output from the imaging device 12. For example, the exposure controller calculates object luminance based on the image data output from the imaging device 12. The exposure controller sets an exposure value by the operation of the operation unit 15, and performs the AE processing which sets the exposure conditions of such as the aperture, the shutter speed, and the ISO sensitivity when photographing so that the object luminance becomes the set exposure value. For example, the exposure controller calculates the output luminance based on a region of a part of the image data output from the imaging device 12 (AE area), and performs the AE processing. For example, the exposure controller may also be configured to calculate the object luminance for each of the plurality of AE areas, and perform the AE processing by aggregating the plurality of object luminances.

The WB controller performs an arithmetic processing for controlling a white balance based on the image data output from the imaging device 12. The WB controller controls a gain of each pixel of RGB of the imaging device 12 using the result of the arithmetic processing.

The recording controller 43 comprises an intermediate buffer for temporarily recording a still image and a moving image. The recording controller 43 successively records the still image and the moving image, etc. acquired by the imaging operation in the intermediate buffer. The recording controller 43 makes a file of the still image and the moving image, etc. recorded in the intermediate buffer, and writes the file in a recording medium M mounted on the memory I/F 17. A still image file is a file to which a predetermined header is added to the image data of the still image. For example, in the header, data indicating exposure conditions, etc. is recorded as tag data.

The display controller 44 controls a display processing performed by the display unit 16. For example, by inputting the image data to the display unit 16, the display controller 44 displays a screen on the display device of the display unit 16. For example, by inputting the image data acquired by an imaging operation to the display unit 16, the display controller 44 displays a still image on the display unit 16. By inputting the image data acquired consecutively by the imaging unit to the display unit 16, the display controller 44 causes the display unit 16 to display a through image.

Furthermore, the display controller 44 generates OSD data for displaying on the display unit 16 an on-screen display (OSD) including the display of a variety of icons and letters, etc. based on various types of setting information and the state of the imaging apparatus 1, etc. For example, the display controller 44 generates OSD data for displaying on the display device of the display unit 16 a photographing mode, various types of setting information, remaining battery capacity, the number of photographable sheets and photographable time, and an AF area, etc. of the imaging apparatus 1. The display controller 44 inputs image data on which the OSD display based on the OSD data is superimposed onto the display unit 16.

The sighting device controller 45 controls the operation of the sighting device 19. For example, the sighting device controller 45 controls light emission by the light source part of the sighting device 19. In this manner, the sighting device controller 45 switches the sighting device 19 between an operating state and a non-operating state.

The sensor shift unit 46 shifts the effective imaging region on the imaging surface of the imaging device 12 in a direction parallel to the imaging surface. For example, by driving the sensor shift mechanism, the sensor shift unit 46 shifts the effective imaging region in a direction parallel to the imaging surface. For example, by shifting a region for reading out a luminance signal, the sensor shift unit 46 also shifts the effective imaging region in a direction parallel to the imaging surface. Furthermore, by driving the sensor shift mechanism of the imaging device 12, the sensor shift unit 46 rotates the imaging surface of the imaging device 12 in directions such as pitch, yaw, and roll. For example, the sensor shift unit 46 causes the imaging surface of the imaging device 12 to operate so that the blur, detected by the acceleration sensor 18 in a variety of directions such as the pitch, yaw, and roll of the lens 10 and the housing of the imaging apparatus 1, is canceled. By shifting the imaging surface of the imaging device 12 in a direction parallel to the imaging surface, the sensor shift unit 46 is capable of shifting the position at which the object forms an image on the imaging surface.

The trimming unit 47 performs trimming which controls the effective imaging region being a range in which an image is acquired by the imaging unit. For example, the trimming unit 47 controls the effective imaging region on the imaging surface of the imaging device 12 based on a range (a trimming range) set based on the control of the framing controller 49. Specifically, the trimming unit 47 controls the imaging device 12 and the signal processing unit 13 so that the image data is acquired using the pixels within the trimming range of the imaging surface of the imaging device 12.

The field angle controller 48 recognizes the focal distance of the imaging lens based on the input from the lens controller of the lens 10, and performs control according to the recognized focal distance. The field angle controller 48 also generates a control signal for changing the focal distance of the imaging lens of the lens 10 based on the operation of the operation unit 15, or the control of the framing controller 49, and inputs the generated control signal to the lens controller of the lens 10.

The framing controller 49 controls the composition of the image to be acquired based on the touch operation by the touch sensor 15*a*. In other words, the framing controller 49 adjusts the position of the object on the imaging optical axis of the imaging lens on the image data based on the designated position input from the touch sensor 15*a*. In the manner mentioned above, the sighting device 19 is provided on the imaging apparatus 1 so that the sighting device optical axis intersects with the imaging optical axis at a preset distance. Therefore, in the case where a user tracks the object using the sighting device 19, there is a high possibility that the object is arranged on the imaging optical axis. Since the lens 10 and the imaging device 12 are arranged in a manner that the imaging optical axis is arranged at the center of the imaging surface of the imaging device 12, there is a high possibility that the object is arranged on the imaging optical axis at the center of the image. Therefore, for example, the framing controller 49 controls the composition so that the main object is arranged at a position that is touched on the display panel 31.

For example, the framing controller 49 controls the composition of the image to be acquired by controlling the sensor shift unit 46 in a manner that would shift the imaging surface of the imaging device 12 based on the touch operation by the touch sensor 15*a*. More specifically, the framing controller 49 shifts the imaging surface of the imaging device 12 in a manner that the optical axis of the imaging lens (imaging optical axis) is arranged at a position touched on the display panel 31.

Figure 3:
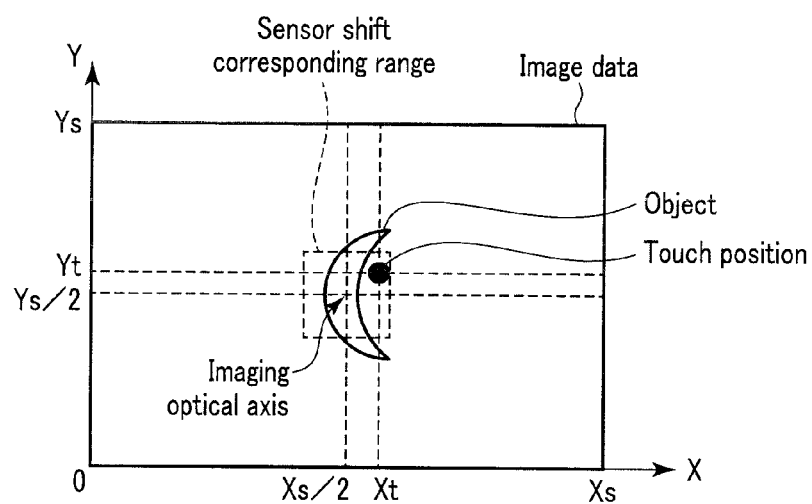
FIG. 3 is a diagram for explaining an example of a touch position in the imaging apparatus according to an embodiment.
Figure 4:
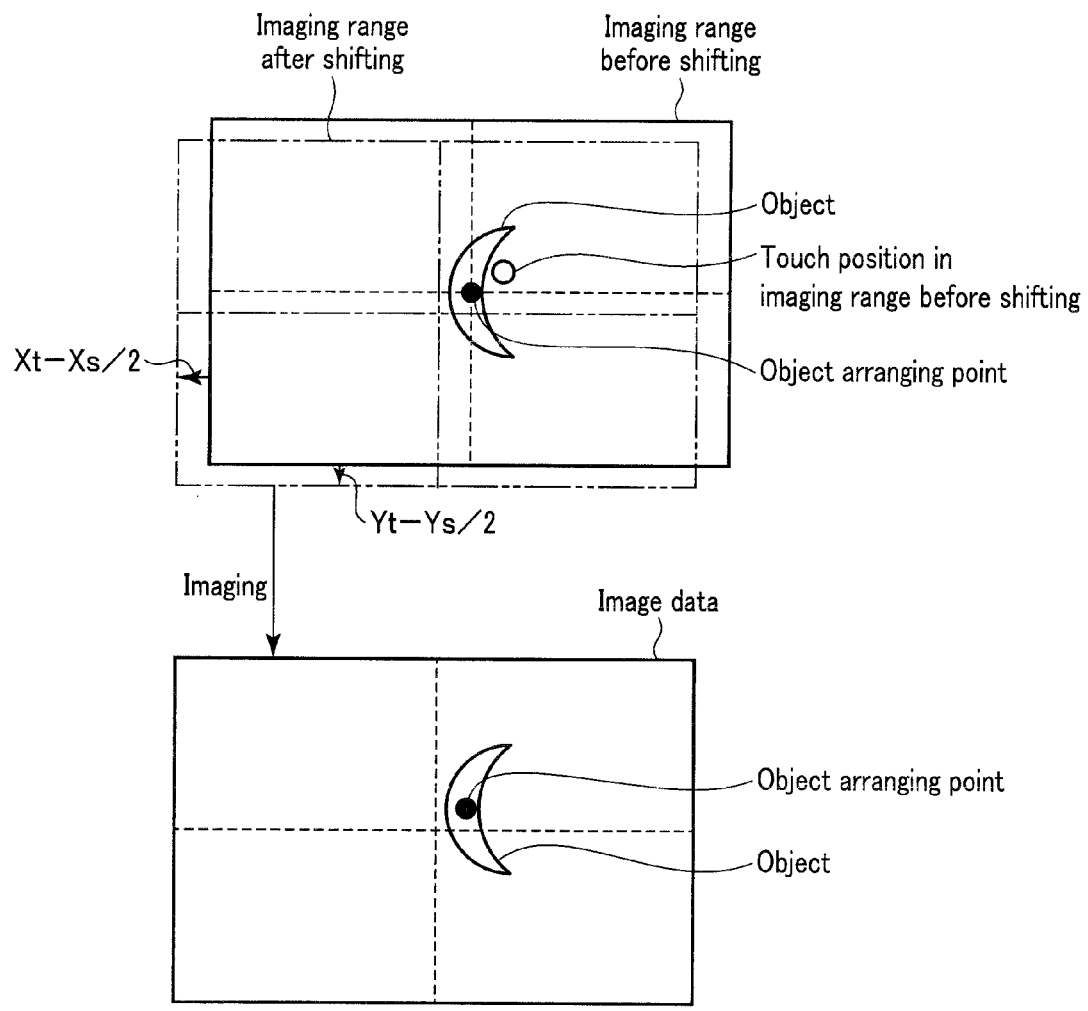
FIG. 4 is a diagram for explaining an example of an operation of a sensor shift by the imaging apparatus according to an embodiment.

FIGS. 3 and 4 are explanatory diagrams for explaining the operation of the framing controller 49. As shown in FIG. 3, image data which is an image acquired in a state where the imaging surface of the imaging device 12 is not shifted can be arranged on a two-dimensional space consisting of an X-axis and and a Y-axis. Each coordinate on the two-dimensional space corresponds to, for example, each pixel of the image data. Therefore, in the case where the number of pixels on the horizontal axis of the image data is expressed as Xs, the end portions of the image data in the X-axis direction will be arranged at "0" and "Xs." In the case where the number of pixels on the vertical axis of the image data is expressed as Ys, the end portions of the image data in the Y-axis direction will be arranged at "0" and "Ys." The imaging optical axis will correspond to the center of the image data, that is, to a coordinate (Xs/2, Ys/2).

Here, for example, in the case where the display touch panel 31 is touched, the framing controller 49 identifies a coordinate (Xt, Yt) of the touched position on the image data based on the touch position signal shown in FIG. 3. The framing controller 49 calculates a shift amount of the imaging surface that is necessary for arranging the imaging optical axis on the coordinate (Xt, Yt) of the touch position. In other words, the framing controller 49 shifts the imaging surface of the imaging device 12 in accordance with the difference between the touch position and the imaging optical axis of the imaging lens. Specifically, based on the coordinate of the touch position and the size of the sensor and pixel, the framing controller 49 calculates the shift amount of the imaging surface so that the coordinate is shifted on the image by (Xs/2)−Xt in the X-axis direction and (Ys/2)−Yt in the Y-axis direction. By inputting the calculated shift amount to the sensor shift unit 46, the framing controller 49 shifts the effective imaging region by the sensor shift unit 46.

By acquiring the image in a state where the imaging surface is shifted in this manner, the main controller 20 is capable of arranging the imaging optical axis to a coordinate (Xt, Yt) of the touch position. In this manner, the main controller 20 is capable of acquiring the image data in which the object on the imaging axis is arranged at the touch position. In this manner, the main controller 20 allows the image data in which the object on the imaging axis is arranged at the touch position to be recorded on the recording medium M as a still image or to be displayed as a through image by the display unit 16.

There is an upper limit to the shift amount of the imaging surface. Therefore, in the case where the touch position is within the sensor shift corresponding range according to the upper limit of the shift amount of the imaging surface, the framing controller 49 controls the composition by shifting the imaging surface in the above-mentioned manner. In the case where the touch position is beyond the sensor shift corresponding range according to the upper limit of the shift amount of the imaging surface, the framing controller 49 controls the composition by trimming.

For example, the framing controller 49 can also control the composition of the image by setting the trimming range on the imaging surface of the imaging device 12 based on the touch operation by the touch sensor 15*a*. More specifically, the framing controller 49 sets the trimming range so that the optical axis of the imaging lens (imaging optical axis) is arranged at a position that is touched on the display panel 31. Here, a specific position of the screen has been designated in a specific field of angle. However, a processing for maintaining the specific position of the screen may be included when zooming, or an application of canceling the designation by a zooming operation may be performed. Cases of moving the sensor physically and moving the effective range of the sensor may be switched optionally.

Figure 5:
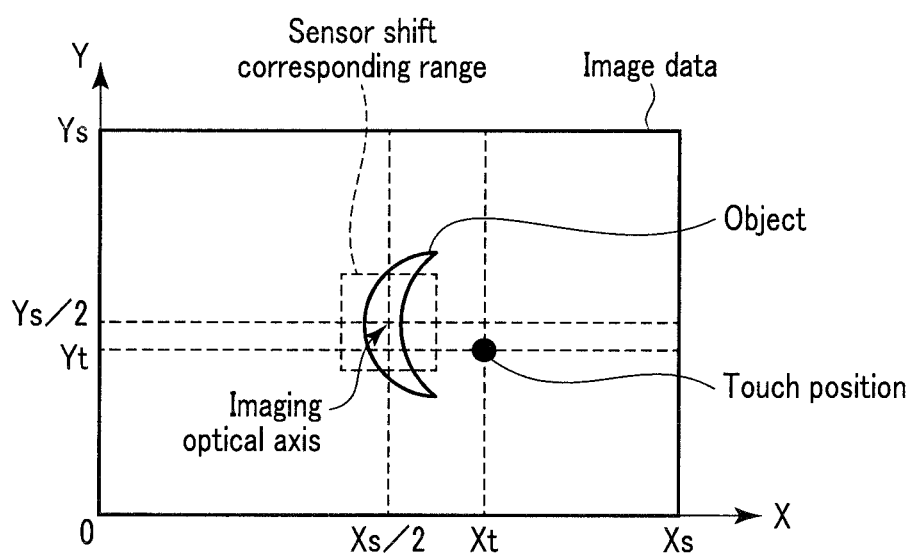
FIG. 5 is a diagram for explaining an example of a touch position in the imaging apparatus according to an embodiment.
Figure 6:
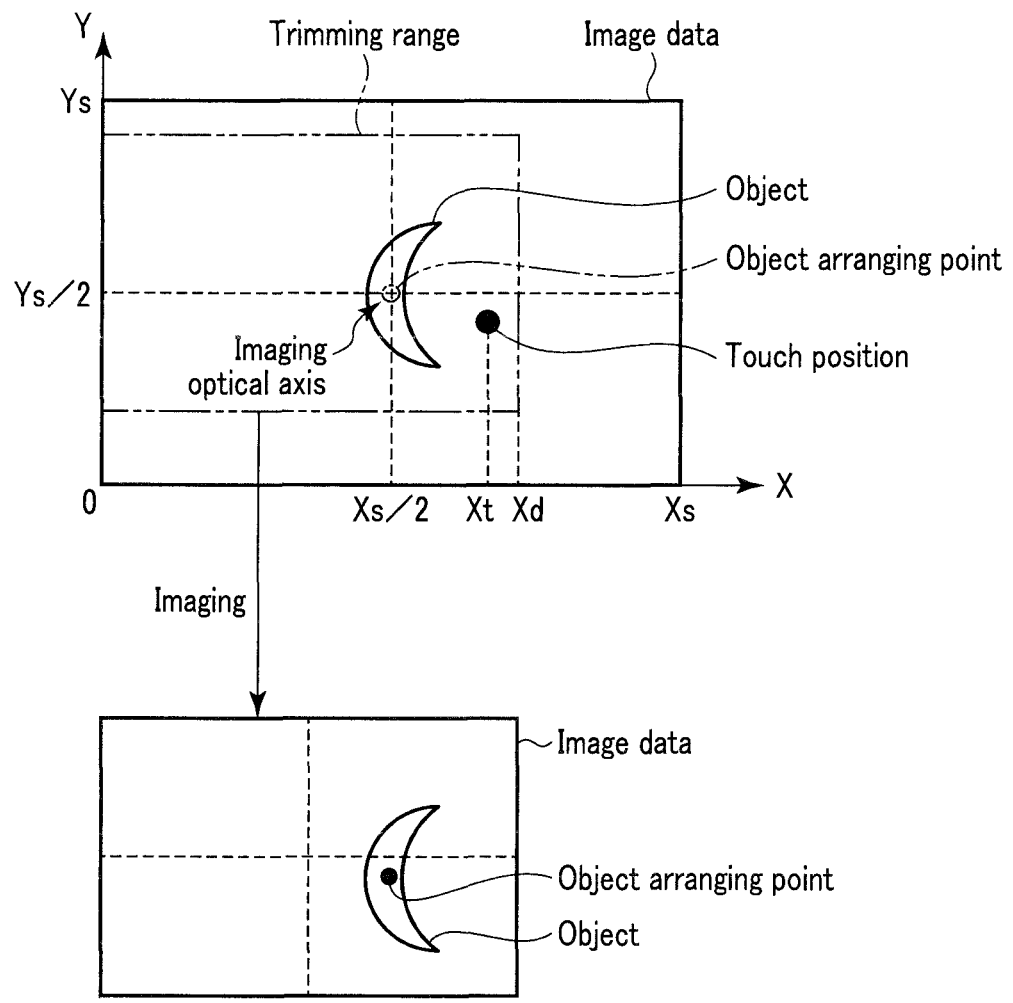
FIG. 6 is a diagram for explaining an example of trimming by the imaging apparatus according to an embodiment.

FIGS. 5 and 6 are explanatory diagrams for explaining the operation of the framing controller 49.

As shown in FIG. 5, the image data acquired in a state where the imaging surface of the imaging device 12 is not shifted can be arranged on the two-dimensional space consisting of an X-axis and and a Y-axis. Here, for example, in the case where the display panel 31 is touched, the framing controller 49 identifies the coordinate (Xt, Yt) of the touch position on the image data based on the touch position signal. The framing controller 49 calculates the trimming range for arranging the imaging optical axis on the coordinate (Xt, Yt) of the touch position.

The framing controller 49 calculates a length Xd in the X-axis direction in the trimming range and a length Yd in the Y-axis direction in the trimming range. The framing controller 49 sets the trimming range so that the coordinate (Xdt, Ydt) of an object arranging point, which is a point corresponding to the touch position within the trimming range, and the coordinate (Xs/2, Ys/2) of the imaging optical axis overlap.

Hereinafter, the calculation method of the trimming range will be explained in detail. Since the ratio of the touch position Xt with respect to the size Xs of the image data in the X-axis direction is equal to the ratio of the object arranging point Xdt with respect to the size Xd of the trimming range in the X-axis direction, the following formula is satisfied.

$$Xt/Xs = Xdt/Xd \qquad \text{(Formula 1)}$$

Since the trimming range is set so that the object arranging point overlaps with the imaging optical axis, the following formula is satisfied.

$$Xdt = Xs/2 \quad \text{(Formula 2)}$$

Based on Formula 1 and Formula 2, the following formula is obtained.

$$Xd = Xs2/(2 \cdot Xt) \quad \text{(Formula 3)}$$

The framing controller 49 calculates the size Xd of the trimming range in the X-axis direction by Formula 3 based on the size Xs of the image data in the x-axis direction and the touch position Xt. Since the size Yd of the trimming range in the Y-axis direction can also be calculated by a similar method as Formula 1 to Formula 3, detailed explanations will be omitted.

The framing controller 49 sets a trimming range in which the size in the X-axis direction is Xd and the size in the Y-axis direction is Yd on the imaging surface of the imaging device 12. The framing controller 49 sets the trimming range at a position where the coordinate of the object arranging point within the trimming range (Xdt, Ydt) overlaps the coordinate corresponding to the imaging optical axis (Xs/2, Ys/2).

Figure 7:
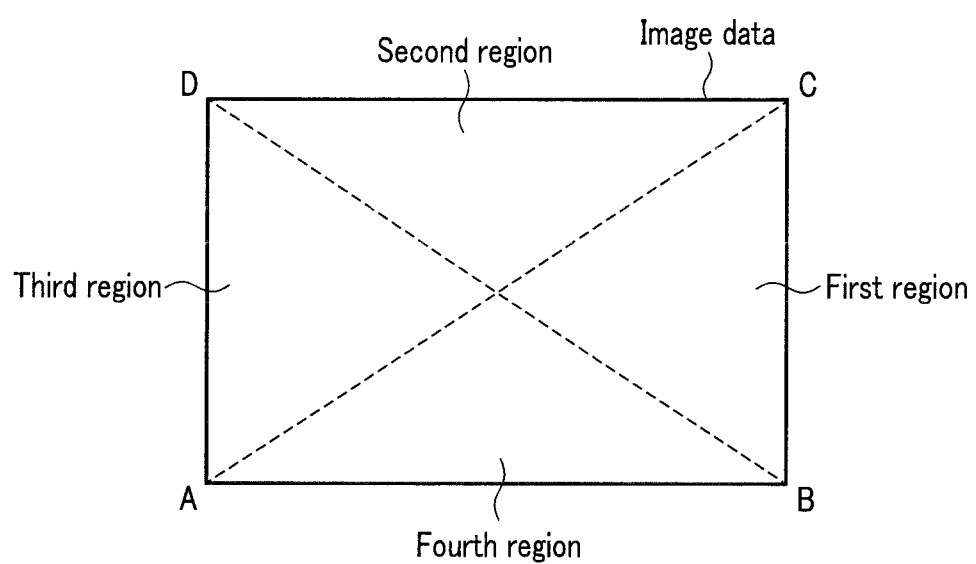
FIG. 7 is a diagram for explaining an example of trimming by the imaging apparatus according to an embodiment.

As shown in FIG. 7, the image data is divided into four regions using diagonal lines. In the case where the coordinate (Xt, Yt) of the touch position is within a first region, the framing controller 49 has one side of the trimming range overlap the side AD of the image data and sets the trimming range. In the case where the coordinate (Xt, Yt) of the touch position is within a second region, the framing controller 49 has one side of the trimming range overlap the side BC of the image data and sets the trimming range. In the case where the coordinate (Xt, Yt) of the touch position is within a third region, the framing controller 49 has one side of the trimming range overlap the side AB of the image data and sets the trimming range. In the case where the coordinate (Xt, Yt) of the touch position is within a fourth region, the framing controller 49 has one side of the trimming range overlap the side DC of the image data and sets the trimming range.

By setting the trimming range on the imaging surface of the imaging device 12 by the framing controller 49 using the above method, and controlling the imaging device 12 so as to acquire an image within the above trimming range, the main controller 20 is capable of arranging the imaging optical axis at the coordinate (Xdt, Ydt) of the object arranging point corresponding to the touch position. In this manner, the main controller 20 is capable of acquiring the image data in which the object on the imaging optical axis is arranged at the object arranging point corresponding to the touch position. In this manner, the main controller 20 is capable of recording the image data in which the object on the imaging optical axis is arranged at the touch position on the recording medium M as a still image, or displaying it by the display unit 16 as a through image.

The operation of the imaging apparatus 1 according to an embodiment will be explained in detail using FIG. 8 and FIG. 9.

In the case where the imaging apparatus 1 is in an imaging standby state, the main controller 20 determines whether or not the sighting device 19 is in operation (step S11). In the case where the sighting device 19 is not in operation (step S11, NO), the main controller 20 images the image data by the imaging device 12. In this case, the main controller 20 images the image data to be used as a through image without operating the shutter unit 11. By inputting the image data to the display unit 16, the main controller 20 has the image data displayed on the display device of the display unit 16 as a through image (step S13).

The main controller 20 determines whether or not the release button of the operation unit 15 has been fully pressed (step S14). In other words, the main controller 20 determines whether or not an operation for instructing the imaging operation has been input by the operation unit 15. In the case where the main controller 20 determines that the release button of the operation unit 15 has not been fully- or half-pressed (step S14, NO), the processing moves on to step S17. In the case where the release button of the operation unit 15 is determined as being fully- or half-pressed (step S14, YES), the main controller 20 stops the through image display and executes the imaging operation (step S15). In this case, the main controller 20 operates the shutter unit 11 and acquires the image data by the imaging device 12 as a still image. The main controller 20 makes a file of the image data as a still image and records it on the recording medium M (step S16).

The main controller 20 determines whether or not to turn the power OFF (step S17). That is, for example, the main controller 20 determines whether or not a power button, etc. of the operation unit 15 was operated, and an instruction to turn the power OFF was input by the operation unit 15. In the case where the power is determined to be turned OFF (step S17, YES), the main controller 20 turns the power of the imaging apparatus 1 OFF and ends the processing. In the case where it is determined to not turn the power OFF (step S17, NO), the main controller 20 returns to the processing of step S11.

In the case where the sighting device 19 is determined as being in operation in step S11 (step S11, YES), the main controller 20 determines whether or not a touch operation was performed for the display panel 31 (step S21). In the case where the main controller 20 determines that a touch operation was not performed for the display panel 31 (step S21, NO), the processing moves on to step S12 of FIG. 8.

In the case where it is determined that a touch operation was performed for the display panel 31 in step S21 (step S21, YES), the main controller 20 identifies the touch position (Xt, Yt) based on the touch position signal (step S22).

The main controller 20 determines whether or not the touch position is within the sensor shift corresponding range according to the upper limit of the shift amount of the imaging surface (step S23). In the case where the touch position is determined as being within the sensor shift corresponding range (step 23, YES), the main controller 20 calculates the shift amount of the imaging surface of the imaging device 12 at which the touch position and the imaging optical axis should overlap (step S24). The main controller 20 shifts the imaging surface of the imaging device 12 in accordance with the calculated shift amount (step S25), and moves on to the processing of step S12.

In the case where the touch position is determined as being outside the sensor shift corresponding range in step S23 (step S23, NO), the main controller 20 calculates the size of the trimming range (step S26). That is, the main controller 20 calculates the lengths of the trimming range in the X-axis direction and in the Y-axis direction based on the touch position.

The main controller 20 sets the trimming range so that the imaging optical axis overlaps the object arranging point which is a point within the trimming range corresponding to the touch position (step S27). The main controller 20 trims the image on the imaging surface of the imaging device 12 based on the trimming range in which a range to be acquired is set (step S28), and moves on to the processing of step S12.

In this manner, by adjusting a position of an object on the imaging optical axis of the imaging lens on the image data based on the touch position (designated position), even in the case of capturing the object by the sighting device, the main controller 20 is capable of preventing the composition from becoming monotonous.

For example, the main controller 20 acquires the image data in a state where the imaging surface is shifted in a manner that the touch position overlaps the imaging optical axis. In this manner, since the object on the imaging optical axis can be arranged at the touch position, the imaging apparatus 1 is capable of preventing the composition from becoming monotonous.

For example, by acquiring the image data in a state where the trimming range is set, the main controller 20 is capable of acquiring the image data in which the object on the imaging axis is arranged at the touch position. In this manner, the main controller 20 allows the image data in which the object on the imaging axis is arranged at the touch position to be recorded on the recording medium M as a still image or to be displayed as a through image by the display unit 16. In the manner mentioned above, since the imaging apparatus 1 is capable of arranging the object on the imaging optical axis at the touch position, the composition can be prevented from becoming monotonous. In the above embodiment, in order to simplify the explanation, a processing in the case of photographing a still image has been explained. However, the processing is not limited to this configuration. Even in the case of imaging a moving image, the imaging apparatus 1 is capable of performing the shifting and trimming of the above effective imaging region. For example, the imaging apparatus 1 may be assumed as imaging a moving image in the case where an object is moving. In such case, the imaging apparatus 1 is particularly useful since the object can be arranged to a touch position when a user is tracking and framing the moving object by the sighting device 19. More specifically, in the case of tracking a flying bird by videography, and, further, wanting to prevent the composition from becoming monotonous, only by having the user concentrate on the operation of aligning the object with an index of the sighting device can the imaging apparatus 1, for example, image a still image or a moving image with a composition in which a space is provided in front of the bird. As a result, the imaging apparatus 1 allows a user to perform photographing with a degree of freedom in the composition by having the user concentrate on finding and capturing an object.

In the above embodiment, the main controller 20 is explained as being configured to set the trimming range without changing the focal distance. However, the main controller 20 is not limited to this configuration. The main controller 20 may also be configured to set the trimming range after changing the focal distance in accordance with a touch position.

FIG. 10 is an explanatory drawing for explaining other examples of the operation of the framing controller 49. As is shown in the aforementioned FIG. 5, the image data is assumed as being arranged on a two-dimensional space. Here, for example, in the case where the display panel 31 is touched, the framing controller 49 identifies the coordinate (Xt, Yt) of the touch position on the image data based on the touch position signal. The framing controller 49 changes the focal distance to a wide angle side where the field of angle becomes wider based on the coordinate (Xt, Yt) of the touch position.

For example, the framing controller 49 calculates a focal distance for canceling the reduction in the field angle caused by the above trimming. Specifically, the framing controller 49 calculates the ratio of length Xd of the trimming range in the X-axis direction with respect to the length Xs of the image data in the X-axis direction as the reduction ratio Rstx in the X-axis direction, and calculates the ratio of length Yd of the trimming range in the Y-axis direction with respect to the length Ys of the image data in the Y-axis direction as the reduction ratio Rsty in the Y-axis direction. The framing controller 49 calculates the focal distance obtained by multiplying the field angle by 1/Rstx in the X-axis direction, or by 1/Rsty in the Y-axis direction. By inputting the calculated focal distance to the field angle controller 48, the framing controller 49 changes the focal distance of the imaging lens of the lens 10.

By setting the trimming range in a manner similar to the examples in FIG. 5 and FIG. 6 above, the framing controller 49 is capable of making the size of the object in the image data before the focal distance change the same as the size of the object with respect to the trimming range after the focal distance change.

In this manner, the object may be prevented from being enlarged compared to that before trimming. By making full use of such idea, it would become possible to maintain a similar setting at various zooming positions. Especially, when performing videography, in many cases, since photographing is performed while changing the field angle in order to add variations to the screen, a method making full use of such imaging range switching produces an effect.

Figure 11:
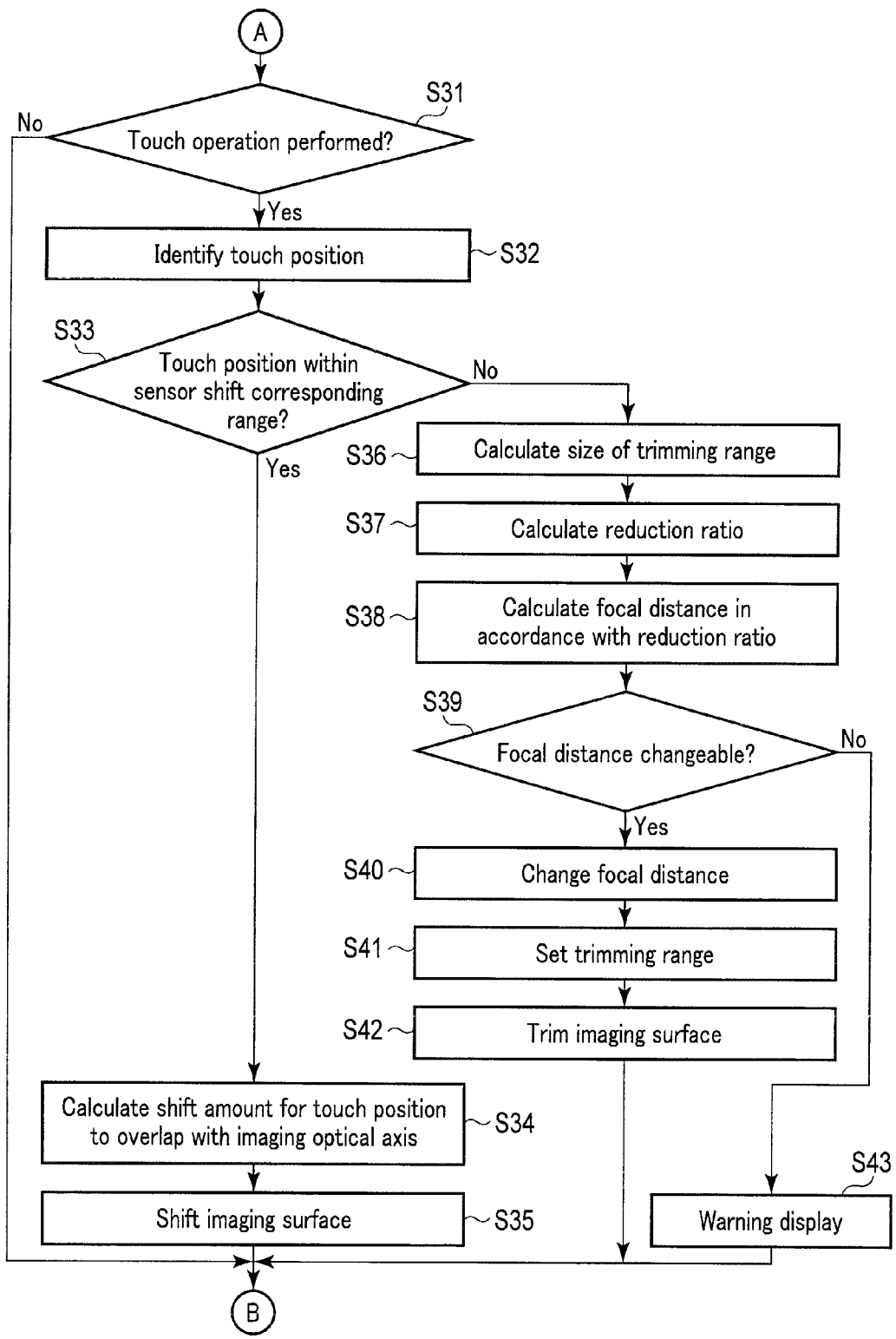
FIG. 11 is a diagram for explaining an example of an operation of the imaging apparatus according to an embodiment.

Another example of the operation of the imaging apparatus 1 according to an embodiment will be explained in detail using FIG. 8 and FIG. 11. Since FIG. 8 has been explained above, here, the explanation will be omitted.

Figure 8:
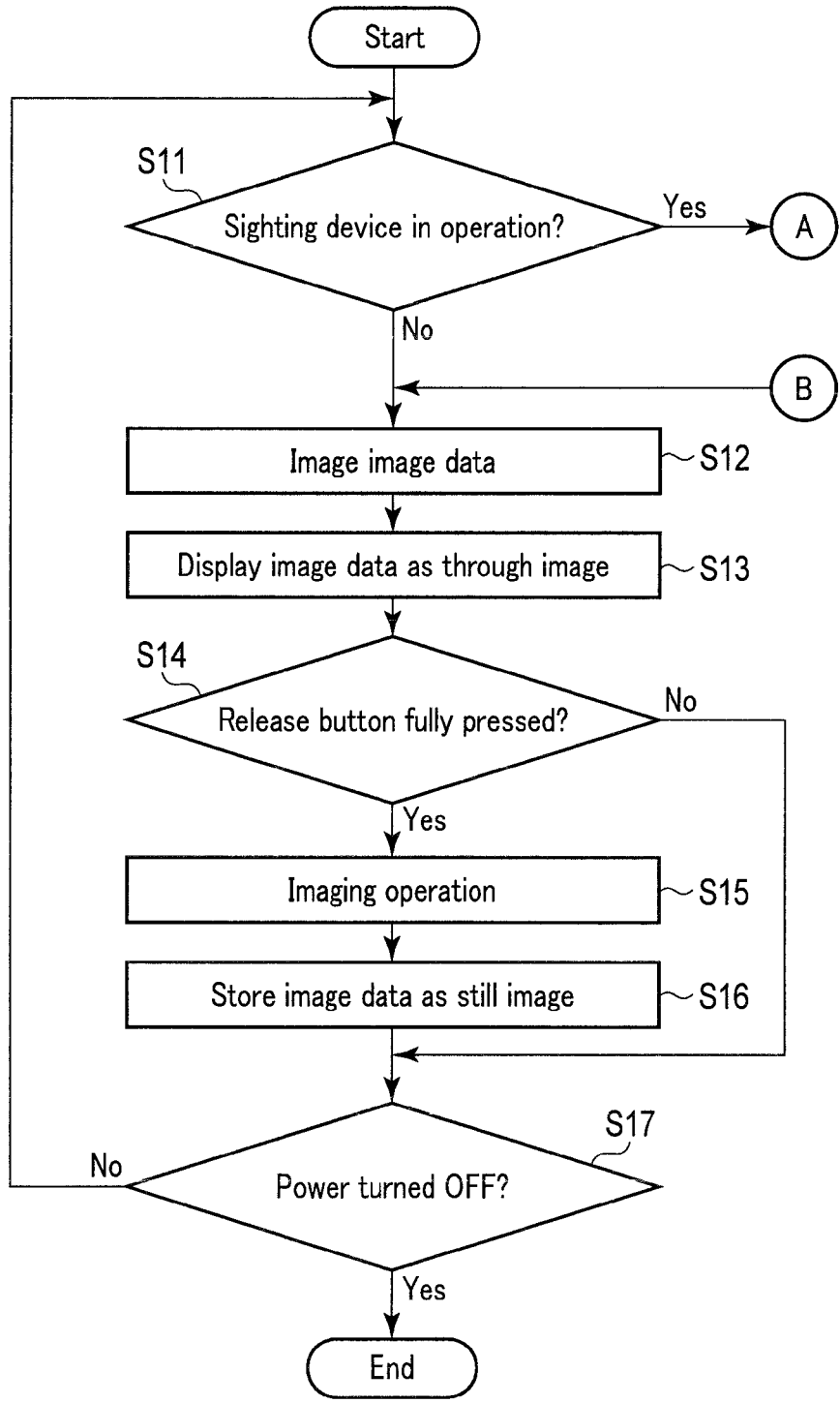
FIG. 8 is a diagram for explaining an example of an operation of the imaging apparatus according to an embodiment.
Figure 9:
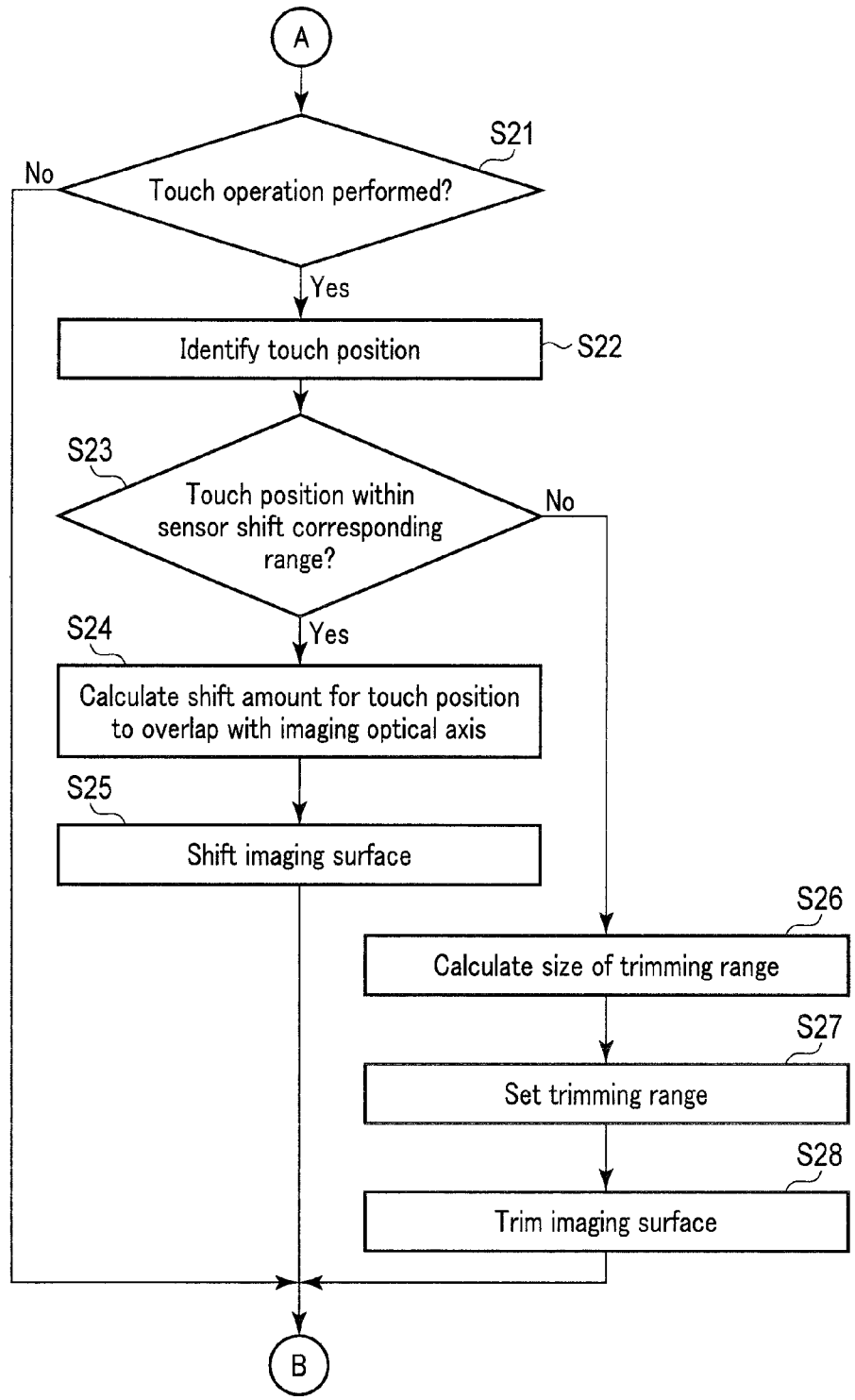
FIG. 9 is a diagram for explaining an example of an operation of the imaging apparatus according to an embodiment.

In the case of determining that the sighting device 19 is in operation in step S11 of FIG. 8 (step S11, YES), the main controller 20 determines the presence/absence of the touch operation with respect to the display panel 31 (step S31). In the case of determining the absence of the touch operation with respect to the display panel 31 (step S31, NO), the main controller 20 moves on to the processing in step S12 of FIG. 8.

In the case of determining the presence of the touch operation with respect to the display panel 31 in step S21 (step S31, YES), the main controller 20 identifies the touch position (Xt, Yt) based on the touch position signal (step S32).

The main controller 20 determines whether or not the touch position is within the sensor shift corresponding range according to the upper limit of the shift amount of the imaging surface (step S33). In the case where the touch position is determined as being within the sensor shift corresponding range (step S33, YES), the main controller 20 calculates the shift amount of the imaging surface of the imaging device 12 at which the touch position and the imaging optical axis should overlap (step S34). The main controller 20 shifts the imaging surface of the imaging device 12 in accordance with the calculated shift amount (step S35) and moves on to the processing of step S12.

In the case of determining that the touch position is outside the sensor shift corresponding range in step S23 (step S33, NO), the main controller 20 calculates the size of the trimming range (step S36). That is, the main controller 20 calculates the lengths of the trimming range in the X-axis direction and in the Y-axis direction based on the touch position.

The main controller 20 further calculates the reduction ratio of the trimming range with respect to the image data (step S37). That is, the main controller 20 calculates the reduction ratios Rstx and Rsty based on the size of the image data and the size of the trimming range.

The main controller 20 calculates the focal distance based on the reduction ratio (step S38). That is, the main controller 20 calculates the focal distance based on either the reduction ratio Rstx or the reduction ratio Rsty. Specifically, in the case where the touch position is within the first region or the third region shown in FIG. 7, the main controller 20 calculates the focal distance which is obtained by multiplying the field angle by 1/Rstx. In the case where the touch position is within the second region or the fourth region shown in F 7, the main controller 20 calculates the focal distance which is obtained by multiplying the field angle by 1/Rsty.

The main controller 20 determines whether or not it is possible to change the focal distance of the imaging lens of the lens 10 to the focal distance calculated in step S38 (step S39). That is, the main controller 20 determines whether or not the calculated focal distance is within a range where the focal distance of the imaging lens of the lens 10 is changeable.

In the case of determining that the focal distance is changeable (step S39, YES), the main controller 20 changes the focal distance of the imaging lens of the lens 10 to the focal distance calculated in step S38 (step S40).

The main controller 20 calculates the lengths of the trimming range in the X-axis direction and in the Y-axis direction based on the trimming ratio, and sets the trimming range so that the imaging optical axis overlaps the object arranging point, which is a point corresponding to the touch position ratio within the trimming range (step S41).

The main controller 20 trims the image on the imaging surface of the imaging device 12 based on the trimming range in which the range to be acquired is set (step S42), and moves on to step S12.

In step S37, in the case where the focal distance is determined as unchangeable (step S37, NO), the main controller 20 performs a warning display (step S43). For example, the main controller 20 performs a warning display that a composition change cannot be made by trimming (step S43). In the case where the focal distance is determined as unchangeable, in step S37, the main controller 20 may be configured to change the composition by the trimming as shown in FIG. 9, without changing the focal distance.

In this manner, by changing the focal distance in accordance with the touch position and setting the trimming range, the main controller 20 is capable of making the size of the object in the image data before the focal distance change and the size of the object with respect to the trimming range after the focal distance change the same. That is, the imaging apparatus 1 is capable of preventing the composition from becoming monotonous by arranging the object on the imaging optical axis at the touch position, and preventing the object from being enlarged in comparison to before the trimming by changing the focal distance and performing the trimming.

As mentioned above, the imaging apparatus 1 is capable of arranging the object at a position corresponding to the touch position within the image data by shifting the imaging surface of the imaging device 12. In this manner, even in the case of aligning the optical system imaging optical axis with the object by overlapping the reticle arranged within the visual field of the sighting device 19 with the object, the imaging apparatus 1 is capable of preventing the composition from becoming monotonous.

By trimming a region from which an image of the imaging surface of the imaging device 12 is to be acquired, the imaging apparatus 1 is capable of arranging the object at a position in accordance with the touch position within the image data. In this manner, even in the case of aligning the optical system imaging optical axis with the object by overlapping the reticle arranged within the visual field of the sighting device 19 with the object, the imaging apparatus 1 is capable of preventing the composition from becoming monotonous.

By changing the focal distance of the imaging lens in accordance with the touch position, and trimming the region from which an image of the imaging surface of the imaging device 12 is to be acquired, the imaging apparatus 1 is capable of arranging the object at a position in accordance with the touch position within the image data, without changing the size in which the object is to be projected. In this manner, even in the case of aligning the optical system imaging optical axis with the object by overlapping the reticle arranged within the visual field of the sighting device 19 with the object, the imaging apparatus 1 is capable of preventing the composition from becoming monotonous, and preventing the object from being enlarged in comparison to before the trimming.

According to the above configuration, an imaging apparatus and a controlling method of the imaging apparatus with higher convenience can be provided.

In the above embodiment, the main controller 20 has been explained as being configured to perform trimming in the case where the touch position is not within the sensor shift corresponding range according to the upper limit of the shift amount of the imaging surface; however, the main controller 20 is not limited to this configuration. For example, the main controller 20 may be configured to perform imaging surface shifting and trimming simultaneously. For example, in the case where the touch position is not within the sensor shift corresponding range according to the upper limit of the shift amount of the imaging surface, the main controller 20 shifts the imaging surface in accordance with the touch position, and further sets the trimming range. According to this configuration, since the imaging optical axis can be brought closer to the touch position by shifting the imaging surface, the trimming range obtained by trimming can be made larger. The main controller 20 may also be configured to shift the imaging surface, change the focal distance, and perform trimming, simultaneously. For example, in the case where the touch position is not within the sensor shift corresponding range according to the upper limit of the shift amount of the imaging surface, the main controller 20 shifts the imaging surface in accordance with the touch position, calculates the focal distance in accordance with the touch position and the shift amount of the imaging surface, changes the focal distance, and sets the trimming range. According to this configuration, since the imaging optical axis can be brought closer to the touch position by shifting the imaging surface, the variation in the focal distance can be suppressed.

In the above embodiment, in the case of trimming, the main controller 20 has been explained as configured to limit the region in which the image of the imaging surface of the imaging device 12 is to be acquired. However, the main controller 20 is not limited to this configuration. The main controller 20 may also be configured to cut out the image data acquired by using the entire imaging surface of the imaging unit based on the trimming range. Furthermore, in this case, the main controller 20 may also be configured to record both the image data before trimming and the image data after trimming on the recording medium M as a still image.

In the above embodiment, the imaging apparatus 1 has been explained as comprising the lens 10. However, the imaging apparatus is not limited to this configuration. The imaging apparatus 1 may also be configured to comprise a mount to which the lens 10 is attachable, instead of the lens 10.

In the above embodiment, the imaging apparatus 1 has been explained as comprising the sighting device 19. However, the imaging apparatus is not limited to this configuration. The imaging apparatus 1 may also be configured to comprise a mounting part such as an accessory shoe to which the sighting device 19 is attachable, instead of the sighting device 19. Needless to say, the imaging apparatus 1 is not merely limited to photographing, and can be applied to various optical equipment such as observation devices and inspection devices, and, industrially, not only to consumer use, but also to industrial fields and medical fields. For example, the imaging apparatus 1 can be utilized for canceling a difference in position caused by different observation methods, etc. such as the linkage between a back mirror and a rear monitor for in-car equipment, etc.

The functions explained above in each of the above embodiments are not limited to being configured by using hardware, and can be realized by using software, in which a program describing each function is read by a computer and realized. Each of the functions may be configured by selecting either the software or the hardware as appropriate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging device which acquires image data based on an image of an object formed on an imaging surface, on which imaging pixels are arrayed, by an imaging lens which is capable of changing a focal distance;
   a display panel which displays the image data;
   a touch sensor which detects a touch position on the display panel;
   a sighting device which allows a user to visually recognize an optical axial direction of the imaging lens; and
   a CPU which, on the image data, adjusts a position of an object on an imaging optical axis of the imaging lens, based on the touch position,
   wherein the CPU:
   changes a focal distance of the imaging lens to a wide angle side in accordance with the touch position; and
   arranges the object on the optical axis of the imaging lens at the touch position by shifting the effective imaging region indicating a range in which the image data in the imaging surface is to be acquired in accordance with the difference between the touch position and the imaging optical axis of the imaging lens.

2. The imaging apparatus according to claim 1, wherein the CPU cuts out the image data in accordance with the touch position.

3. The imaging apparatus according to claim 1, wherein the CPU shifts the imaging surface in accordance with the touch position, and moves the effective imaging region on the imaging surface by the shift unit in accordance with the difference between the touch position and the imaging optical axis of the imaging lens.

* * * * *